US005194881A

United States Patent [19]

Hirt

[11] Patent Number: 5,194,881

[45] Date of Patent: Mar. 16, 1993

[54] SYSTEM AND METHOD TO PROGRAM A PRINTING FORM

[75] Inventor: Alfred Hirt, Munich, Fed. Rep. of Germany

[73] Assignee: Man Roland Druckmaschinen AG, Offenbach am Main, Fed. Rep. of Germany

[21] Appl. No.: 776,623

[22] Filed: Oct. 15, 1991

[30] Foreign Application Priority Data

Dec. 7, 1990 [DE] Fed. Rep. of Germany ....... 4039105

[51] Int. Cl.[5] ........................ G01D 15/06; B41M 5/00

[52] U.S. Cl. ................................ 346/158; 101/463.1; 101/467

[58] Field of Search ............................... 346/158, 74.3

[56] References Cited

U.S. PATENT DOCUMENTS 3,673,597 6/1972 Horst et al. .......................... 346/158
3,795,009 2/1974 Gaynor ............................ 346/74.3
3,999,481 12/1976 Sankus ................................ 101/451
4,307,165 12/1981 Blazey et al. ........................... 430/8
4,446,858 4/1984 Nishibu et al. ........................ 430/49
4,721,967 1/1988 Roche ............................. 346/158 X
4,833,990 5/1989 Hirt et al. ........................... 101/130

*Primary Examiner*—George H. Miller, Jr.
*Attorney, Agent, or Firm*—Frishauf, Holtz, Goodman & Woodward

[57] ABSTRACT

To program or selectively image or erase a printing form (9) of ferroelectric material, in which the state of polarization of discrete areas of the printing form is controlled, utilizes an electron beam (12) generated by an electron gun (1, 3) which is impinged against a surface area (30) of the ferroelectric printing form. The beam is controlled in accordance with an image to be recorded, for subsequent printing, on the printing form; it is directed to the ferroelectric material by an electron beam focussing and accelerating system, for example similar to the system used in a television camera. The printing form (9) can be sealed with respect to an evacuated electron gun by a slide seal (14, 15) with a vacuum lock, or by a ferrofluidic vacuum lock (18, 20); or the electron gun can be closed by a Lenard window, or an end plate (27) with micro channels or micro ducts (26) therein. The intensity of the beam can be controlled by a suitable image control unit (32*a*).

18 Claims, 5 Drawing Sheets

SYSTEM AND METHOD TO PROGRAM A PRINTING FORM

FIELD OF THE INVENTION

The present invention relates to forming an image on a printing form, which has a surface of ferroelectric material, capable of being polarized by selective polarizaton and depolarization of the surface, and more particularly to apparatus and method for polarizing, in a selective direction of polarity, repolarizing or depolarizing the printing form, and to erase previously polarized domains so that a new image can be applied on the printing form.

BACKGROUND

The referenced Hirt et al Patent 4,833,990 describes a printing form image carrier within a printing press which is coated with ferroelectric material. An electrode pair and a heat source are provided for localized polarization or depolarization, respectively, the electrodes being controlled by an information transmitting unit. The system uses the characteristic of ferroelectric material that differently polarized locations of the ferroelectric material have respectively different affinity for ink and water. Polarizing the printing form in accordance with an image to be reproduced is obtained by spontaneous flip-over of selected regions, which are actually domains, within the material, under the influence of an electric field. It is typical for ferroelectric materials that this spontaneous polarization occurs when a predetermined field strength, depending on the material, is provided, the field strength being referred to as the coercitive field strength of the material.

Once the material, or a region thereof, has been polarized, it remains in the previously generated polarized state. This state is stable, and will be obtained by building an electrical field within the interior of the material due to the charge applied to the surface. The electrical field within the material aligns the ferroelectric domains upon polarization. They will form, fixed in location or space, a double layer of charge and counter charge formed by a dipole. This alignment can be destroyed only by strong external fields or by high temperature; in other words polarizing the material can be changed to depolarization or reverse polarization only by an electric field of the same strength, but in opposite direction or, respectively, by heating above the Curie temperature level, or Curie point. Only when the required charge quantity necessary for spontaneous polarization can flow to the surface of the printing form, polarization can be obtained; this means that the product of current x time must have a predetermined and suitable high level.

In accordance with the Hirt et al patent, pin or strip electrodes can be used. Charge transferred to the surface of the ferroelectric material is obtained by contact or micro discharge in a gap between pin electrodes and the surface of the printing form. An abrasive loading is applied to the surface, and the charge which is transferred may not always be sufficient.

THE INVENTION

It is an object to provide an electrode system, and a programming method in which a sufficient quantity of charge can be applied to a ferroelectric layer on a rotatable cylinder in a printing machine without contact, to result, upon contactless charge transfer, in improved definition of the image points, and without applying wear on the ferroelectric surface.

Briefly, an electron beam is provided for polarization, repolarization or depolarization, respectively, of a printing form of a ferroelectric material, which is generated and guided in a vacuum; it is generated by an electron beam gun, controlled by an information control unit, the beam being directed on the printing form in order to polarize predetermined localized areas of the printing form.

The imaging space adjacent the printing form on the cylinder in the printing machine, within which the electron beam operates can be sealed against ambient pressure by sliding seals, or ferro fluids; or, vacuum-tight windows, or a pipe plate can be used to pneumatically separate the beam generating gun from the ferroelectric surface on the cylinder. An arrangement which includes an electron. detector to receive signals in the form of secondary electrons derived from the printing form can be provided.

DRAWINGS

DETAILED DESCRIPTION

Figure 1:
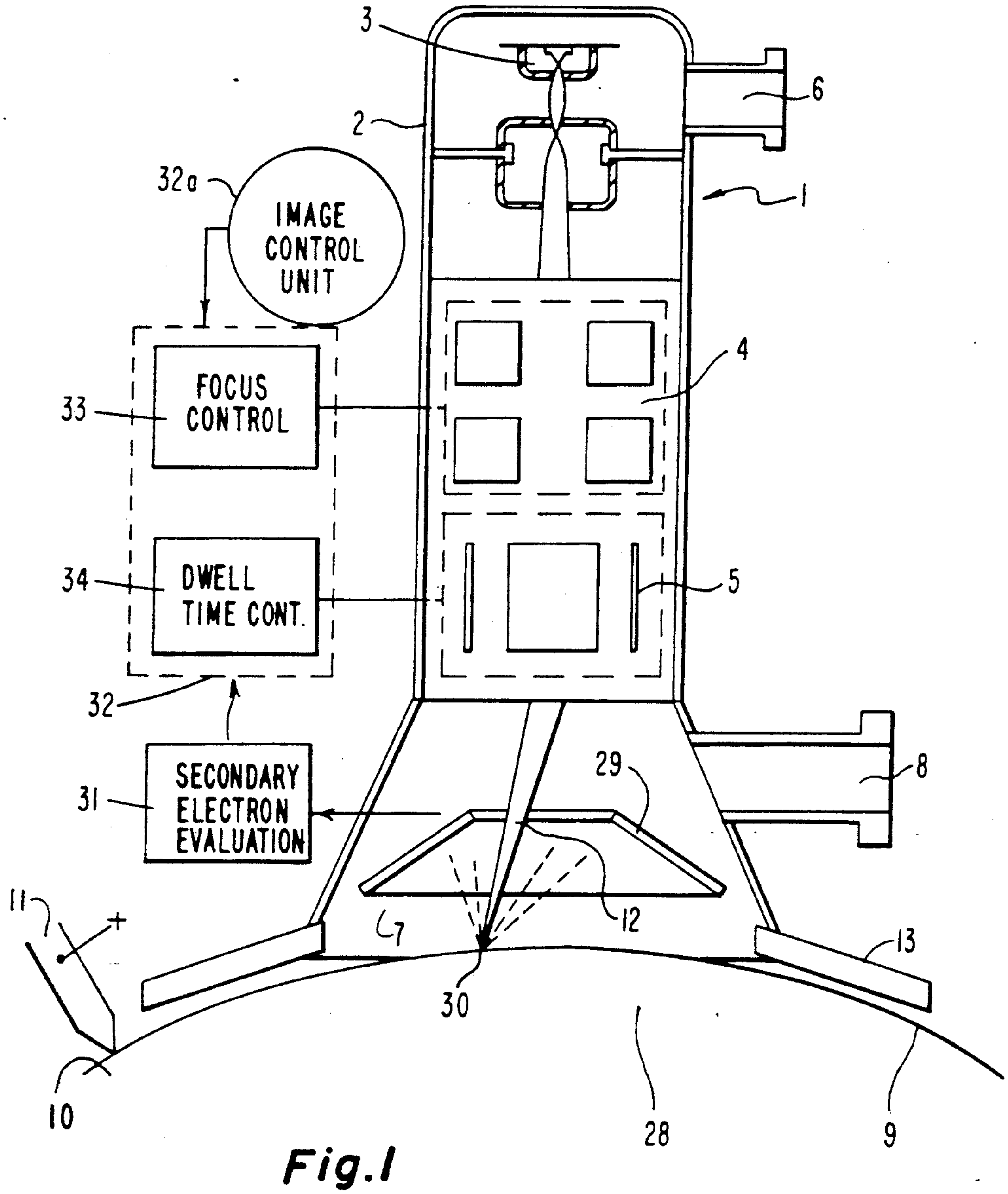
FIG. 1 is a highly schematic view of a system in accordance with the present invention.

The general system, in accordance with the present invention, is illustrated in FIG. 1 which, highly schematically, shows an electron beam gun 1 which has an evacuated housing 2 to prevent dispersion of electrons due to the presence of air molecules. A beam generating system 3 generates an electron beam, and accelerates the electron beam to a predetermined speed, and provides for focussing of the beam. A beam focussing and forming system 4 formed, for example, by either electrostatic or electromagnetic lenses, is provided and downstream thereof is a deflection system 5, which may be an electrostatic or an electromagnetic system. Electron beam guns with focussing and deflection systems are well known and any suitable system may be used.

To increase the lifetime of the beam generating system 3 and to decrease the probability of collision with gas molecules, a gas pressure in the housing 2 of not larger than about $10^{-3}$ mbar is preferred. A pump 6 is coupled to the housing 2. The pump 6, preferably, is a high vacuum pump such as a turbomolecular pump, a cryopump or a diffusion pump.

The beam, focussed and deflected in the systems 4 and 5, enters an imaging space 7, which is separated from the remainder of the housing 2 by diaphragms, small tubes, pipes, micropipes or the like. The space 7 can be evacuated, and a pump 8 which, for example, can be similar to the pump 6, is coupled to the space 7. The space 7 is limited or defined at its outer limits by an enlargement 13. An electron detection sensor 29 is located above a printing cylinder 10, which carries a printing form 9. The electron beam 12 impinges at an impact or impingement point 30 on the printing form 9.

The electron beam gun is located radially above a printing cylinder 10. The printing form 9 on cylinder 10 is formed by a coating, or cover or layer of a ferroelectric material. The electron beam gun does not touch the form or layer 9.

A positively charged contact strip 11 is located axially along the cylinder 10. It is positively charged.

Operation

The electron beam 12 generated by the electron gun 1 is directly applied on the ferroelectric printing form 9 on the printing cylinder 10. The printing form 9 is previously positively polarized by the contact strip 11; alternatively, a depolarized or non-polarized printing form 9 can be used, which is then negatively polarized by the negatively charged electrons. Depolarization can be obtained by applying a heat source on the polarized layer 9, for example by subjecting the polarized layer 9 to a laser, heated pins or the like, or by otherwise heating the ferroelectric material of layer 9 above the Curie point.

Primary electrons which are emitted by the radiation generating system 3 are accelerated by a suitable controllable direct voltage and are bundled and focussed to the electron beam 12 by the electron lenses. The electron beam 12 is so deflected that it scans the layer 9 on the cylinder 10 in a point-by-point field or pattern, as the cylinder 10 rotates.

The interaction of the fast primary electrons with the ferroelectric layer 9 or printing form 9 on the cylinder 10 generate secondary electrons 28 which, in general, are emitted from the surface of the ferroelectric printing form 9 in directionally random manner. They can be sensed and measured by the electron detector system 29 in form of a secondary electron current. The electron detector system or sensor 29, essentially, is a ring-shaped electrically conductive electron trap which, in the simplest form, is merely a sheet metal element. Better sensitivity can be obtained by systems which include a photo multiplier. In general, all arrangements are suitable which are also used in scanning electron microscopes The impingement point 30 of the primary electrons 12 is predetermined by the deflection system 5. Thus, the secondary electron current 28 can represent the intensity of the image points, and displayed on a cathode beam tube which is scanned in synchronism with the deflection of the primary electron beam 12.

The secondary electron yield depends on the type of the material and the topography of the surface of the ferroelectric printing form 9 on the cylinder 10 and, further, on the surface potential of the charged form, or printing plate 9. The contrast obtained in the secondary electron image upon change in the topography can be used to detect defects on the surface. The potential contrast which is modulated or superimposed on that contrast is a direct measure for the charged state of the ferroelectric printing form 9; this charged state, again, is a measure for the degree of polarization of the respective image point. Thus, the gray value in the secondary electron image provides a measuring value which can be evaluated in the secondary electron evaluation unit 31 representative of the programming or writing-on onto the ferroelectric layer 9 in the form of images, for recording on the ferroelectric layer 9.

In accordance with a feature of the invention, the secondary electron level can be used, by the secondary electron evaluation unit 31, to control and/or adjust an information transfer unit 32, such that the size of the image points can be controlled, for example by electronically controlling a focus control unit 33 and/or a dwell time control unit 34. The image size, thus, is controlled by the focus unit 33. The dwell time control unit 34 controls the dwell time of the beam 12 and hence the degree of polarization at any image point on the ferroelectric plate or layer 9.

This arrangement and system of polarization has numerous advantages. For one, the electron beam 12 delivers a sufficient charge at a suitable charge level and thus permits short imaging time. For another, the individual scanning points or pixels can be made very small, that is, be in the order of less than 10 micrometers in diameter. The resolution, thus, can be extremely high. The electron beam 12 can be controlled, without inertia, by suitable arrangements, well known from television technology, e.g. image control unit *32a*.

Control of the size of the image point can be easily obtained by suitable focussing or defocussing the electron beam in the beam formation system 4 of the electron gune 1. Polarization in accordance with an image is obtained completely without contact with an electrode, that is, without abrasive loading of the material. Polarization is more easily accomplished when the temperature is elevated than when the temperature is low. The electron energy of the electron gun 1 can be readily controlled by suitable setting of the acceleration voltage of the beam generating system 3, and thus a predetermined defined local warming can be achieved, which facilitates polarization.

Multiple reversible change of the printing form is readily possible when using such a system.

One difficulty arises when using an electron beam 12 as a writing element; it is necessary to guide the beam 12 in a vacuum since, at ambient air pressure, the reach or range of the electrons is too small. In other words, the cylinder 10, at ambient air pressure, and the beam 12 in the space 7 are pneumatically separated.

Referring now to FIGS. 2–5, which illustrate various embodiments to permit use of an electron beam for writing on a ferroelectric surface of a printing plate or forming a printing plate, by applying an electron beam from an electron gun on the printing plate to obtain predetermined polarization thereof in tiny localized areas.

Figure 2:
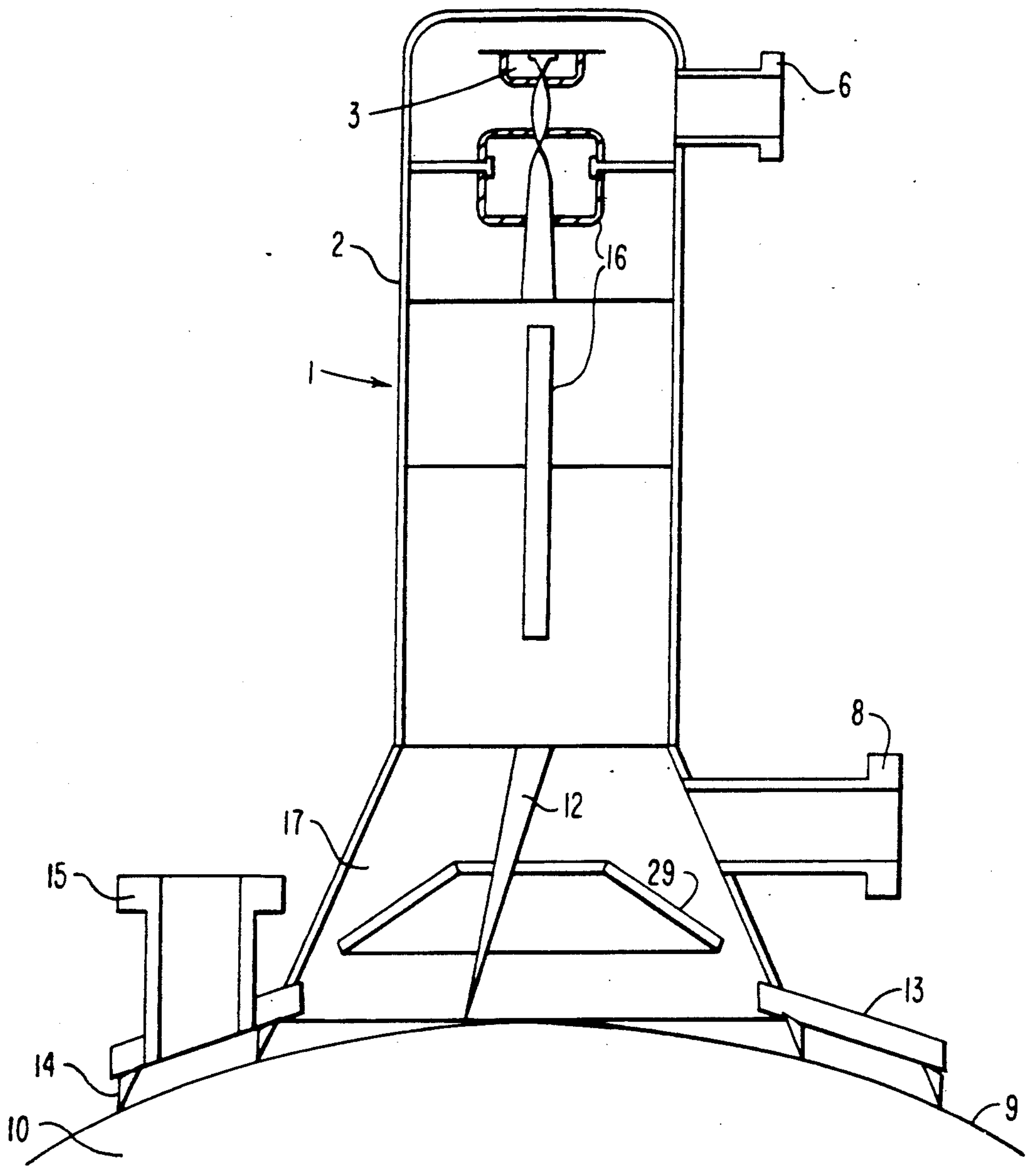
FIG. 2 is a view similar to FIG. 1 and illustrating one form of maintaining a vacuum between an electron beam gun and a printing surface.

FIG. 2 shows a mechanical system to maintain a vacuum between the expansion portions 13 of the space 7 and the printing plate 9, applied to a cylinder 10.

A pair or several slide or slip seals 14 are located on each side of the housing 2 between the extension portions 13 and the ferroelectric form 9. A vacuum pump 15, or a connection to a vacuum pump, is located between two each slide seals 14. The electron beam generating system 3 is separated from the imaging space 17 by diaphragms 16 and/or tubular elements. The space 16 can be held in a vacuum which is less than $10^{-4}$ mbar by the pumps 6 and 8. The space 17 is additionally pumped by the pump 15, coupled between the slide elements 14, so that a differentially pumped vacuum lock will result.

Figure 3:
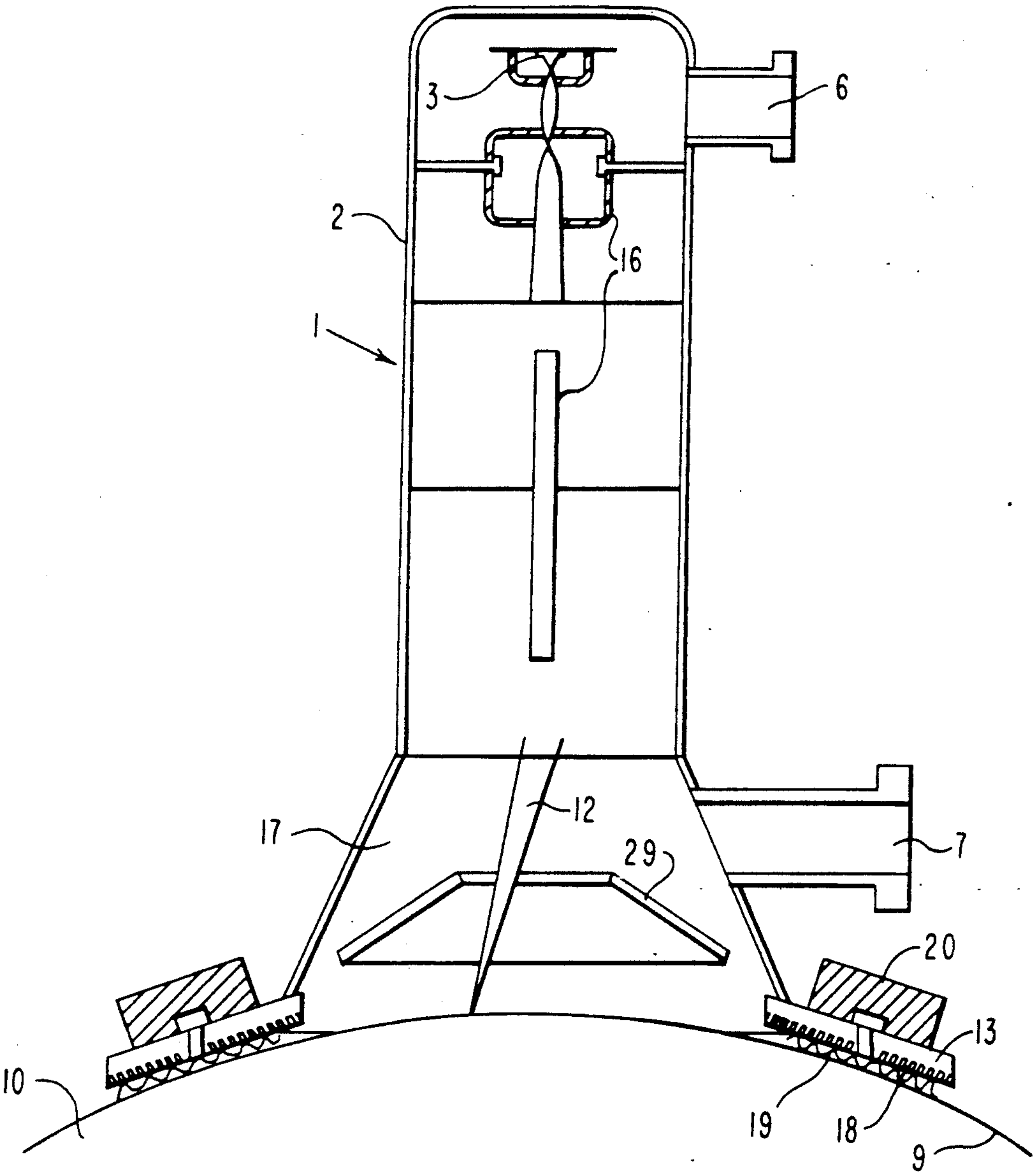
FIG. 3 is a schematic view illustrating a ferrofluidic system to maintain a vacuum between the electron gun and the surface of a printing plate.

FIG. 3 illustrates another embodiment, in which, rather than using slide seals, a ferroelectric fluid 18 is used to seal the space 17 between the extension portions 13 of the housing and the ferroelectric cover, layer or form 9 on the cylinder 10. A ferro fluid is a suspension of magnetic elements, in the form of small ferric particles in a carrier liquid. If a ferro fluid 18 is introduced in the gap 19 between the housing 2 and the surface of the form 9, a focussed ring, magnetically affecting the ferric particles of the ferro fluid, will form, as well known in sealing technology of rotary seals. It effectively seals the housing 2 of the electron beam gun 1 with respect to the ferroelectric printing form 9. Permanent magnet 20 provides the magnetic field.

Figure 4:
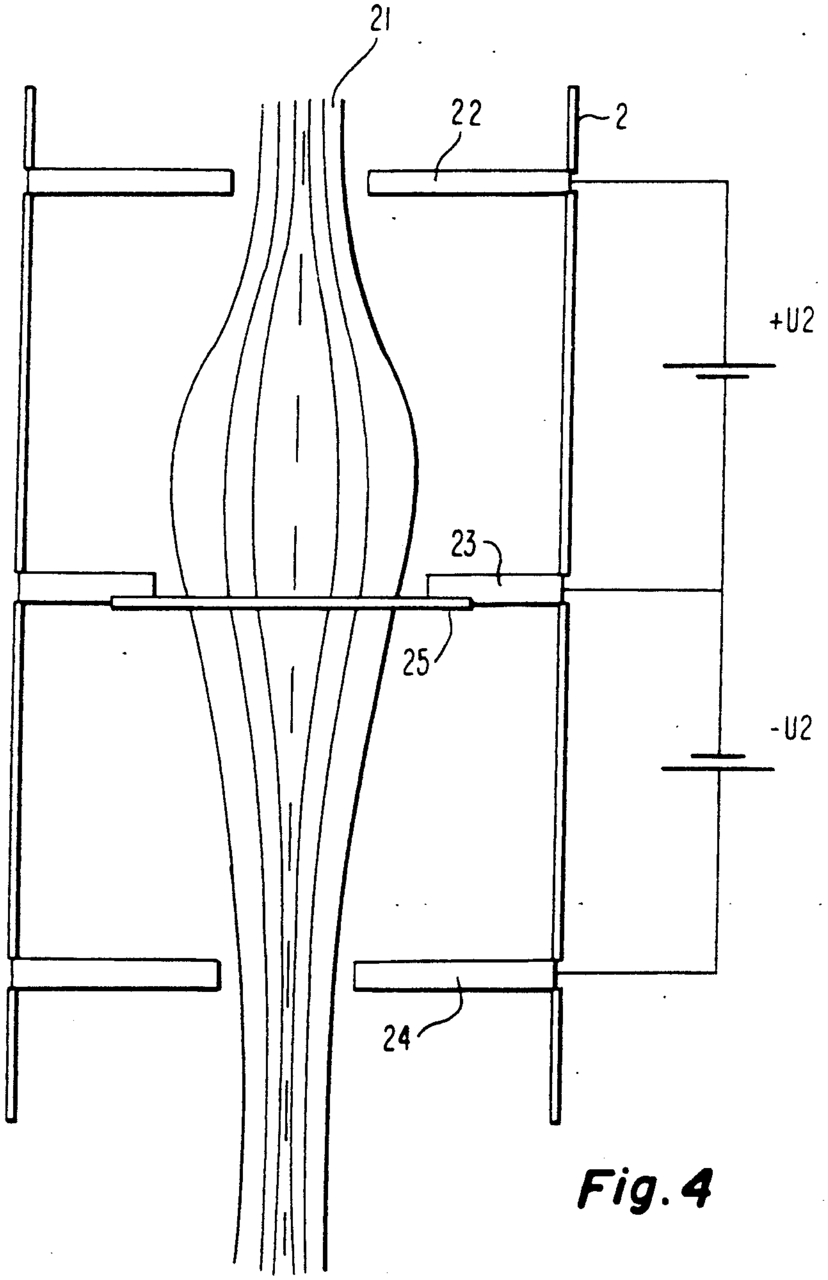
FIG. 4 is a fragmentary diagram illustrating the use of a Lenard window.

FIG. 4 illustrates another embodiment to apply an electron beam unto the form 9. Rather than using a vacuum lock, as in the embodiments of FIGS. 2 and 3, a vacuum-tight window 25 seals the electron beam gun 1 with respect to ambient air pressure. It is preferably located between the beam generating system 3 and the imaging space 17 in lieu of a diaphragm. Such windows, known as Lenard windows, made of a thin metal or oxide foil, are well known. These windows can pass an electron beam with a loss of under 10%. They are mechanically stable, and they can tolerate a pressure differential of 1 bar.

FIG. 4 also illustrates another embodiment or a variation of the electron beam generating system 3. The electron loss in the Lenard window 25 is highly dependent on electron energy. The electron beam 21 is first accelerated from a first electrode 22 towards an intermediate or central electrode 23 by means of the voltage $+U_2$, which results in high acceleration: A further voltage $-U_2$ then brakes the electron beam, the voltage $-U_2$ being applied between the electrode 23 and a braking electrode 24. The window 25 is preferably placed, as shown, in the direction of the beam beyond the opening of the central electrode 23, so that the losses are low.

Windows of this type have the advantage that housing 2 of the electron gun is completely closed and can be subjected to high vacuum, which substantially increases the lifetime of the beam generating system 3.

Figure 5:
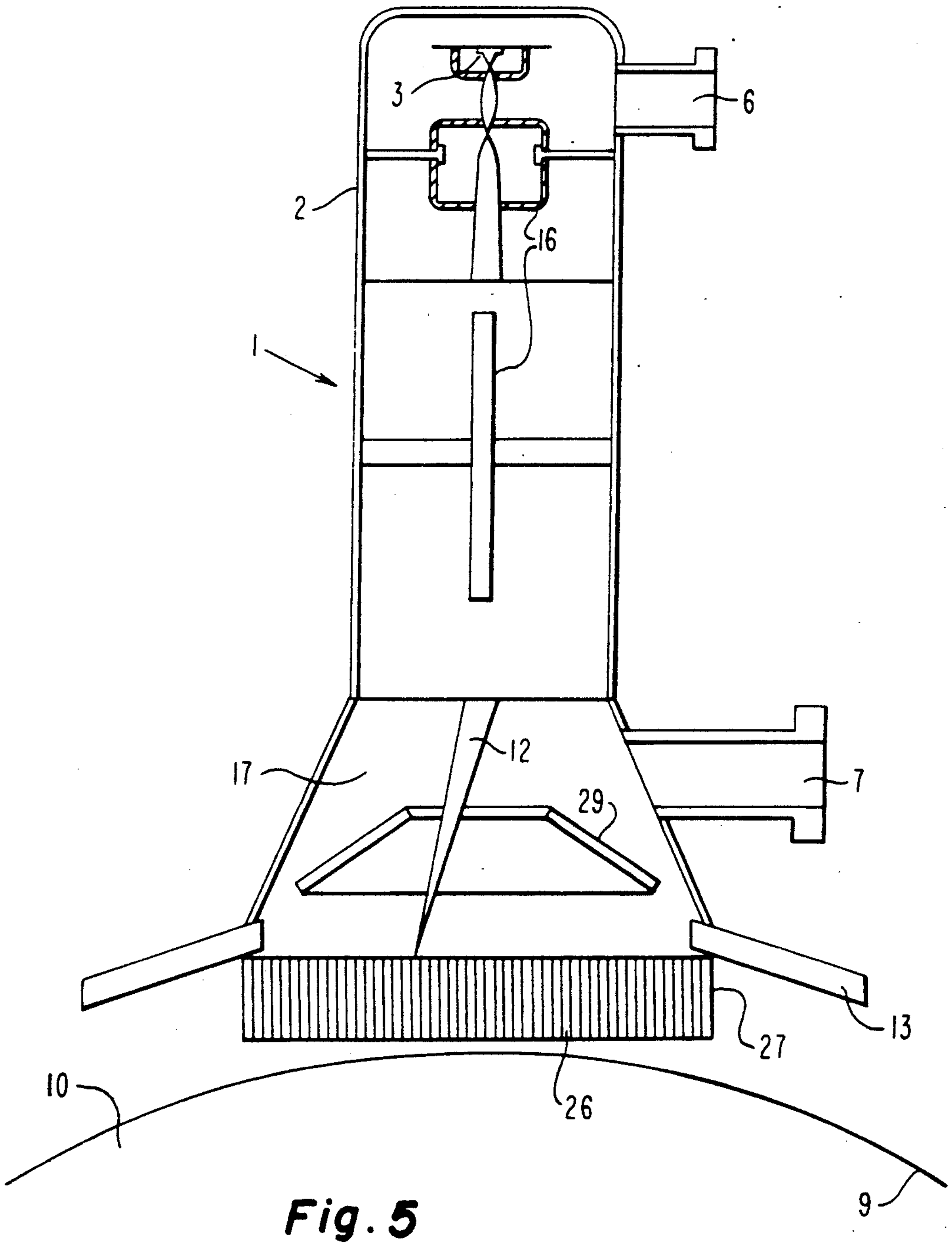
FIG. 5 is a schematic diagram illustrating programming of a printing plate using a plurality of micro tubes or pipes controlled by an electron beam.

In the embodiment of FIG. 5, the evacuated housing 2 which retains the electron beam gun is supplied with a plate 27 which has a plurality of ducts 26 passing therethrough. The plate 27 is located in the region of the electron emission from the gun 1. Preferably, the plate is a micro-channel plate, having channels or ducts with a diameter of from between 10 to 20 micrometers. These ducts or channels, or micropipes 26 shield the evacuated housing 2 with respect to the outer ambient normal air pressure. At the same time, the ducts 26 provide a high resolution system of the overall arrangement for programming the plate 9 in accordance with an image. The resolution which can be obtained depends on the distance between the plate 27 and the surface of the ferroelectric printing form 9, since the charge current, due to the low reach of the electrons at normal air pressure no longer can be geometrically controlled.

The micropipes or ducts 26 have the effect of a charge enhancement, which is a specific advantage of this embodiment. The energy-rich electrons generate secondary charge carriers by collision with gas molecules in the ducts or micropipes 26 and with the wall surfaces of the ducts or micropipes. This results in a highly increased charge carrier current towards the surface of the ferroelectric printing form 9.

As a variation with respect to this embodiment, each one of the ducts 26, or the entire plate, can be closed off at the upper surface, or in the middle, or at the lower surface, by a Lenard window, or by Lenard windows. Such arrangements can easily be made by an etching process.

By suitable selection of the medium within the ducts, a charge carrier amplification of between 1 to 20 times amplification can be obtained.

The arrangement can be used to generate various types of charge images on the printing form 7, and the printing form 9 can have toner particles directly applied thereto, which toner particles may be charged, for example as described in detail in the referenced application Ser. No. 07/609,009, filed Oct. 29, 1990, Fuhrmann.

Various changes and modifications may be made within the scope of the present invention.

I claim:

1. A system for selectively forming and erasing an image on a printing form (9) of ferroelectric material, forming a surface layer on a rotatable printing cylinder (10) of a printing machine, wherein said printing cylinder (10) and said ferroelectric layer (9) thereon are at ambient air pressure, comprising electron beam generating means (1, 3) for generating an electron beam (12) of sufficient intensity to control the polarization of discrete areas of said ferroelectric material of the form (9);

means (32*a*) for controlling said electron beam generating means (1, 3) and coupled to said electron beam generating means in accordance with image information;

means (4, 5, 33, 34) for directing said beam onto said ferroelectric material of the printing form for controlling the polarization of said discrete areas thereof;

means for defining an imaging space (7, 17) positioned between an exit region of said electron beam generating means (1, 3) and said printing form (9); and means (14, 15, 18, 25, 27) for pneumatically separating the printing cylinder (10) and said ferroelectric surface layer (9) thereon remote from or outside of said imaging space (7, 17) from the electron beam generating means (1, 3).

2. The system of claim 1, wherein said imaging space defining means is coupled to said electron beam generating means; and the separating means comprises means (18, 20) for sealing the imaging space defining means (7, 17) with respect to the surface of the printing form (9) exposed to said electron beam.

3. The system of claim 2, wherein said means for sealing the imaging space comprises a slide or slip seal (14).

4. The system of claim 3, wherein said slide or slip seal includes at least two spaced slide elements (14) sliding on said surface of the plate;

and vacuum means (15) applying a vacuum between said slide elements.

5. The system of claim 2, wherein said means for sealing the imaging space comprises a ferro fluid (18) positioned in a gap (19) between said means defining the imaging space (17) and the surface of said form (9).

6. The system of claim 1, further including an evacuated housing (2) retaining said electron beam generating means (1, 3); and wherein said separating means comprises a vacuum-tight window (25) interposed between said housing and the surface of said printing form.

7. The system of claim 6, wherein said vacuum-tight window comprises a Lenard window.

8. The system of claim 1, further including an evacuated housing (2) retaining said electron beam generating means (1, 3); and wherein said separating means comprises a perforated plate (27) having a plurality of passages or ducts (26) closing said evacuated housing with respect to the surface of said printing form (9).

9. The system of claim 8, wherein said passages or ducts are micro channels (26).

10. The system of claim 1, further including a secondary electron detecting means (29) located above the printing form (9) and in the vicinity of an impingement point (30) of the electron beam (12) on said printing form; and means for evaluating signals representative of said secondary electrons sensed by the secondary electron sensing means.

11. A method of selectively forming an erasing an image on a printing plate or form (9) of ferroelectric material supported on a rotatable cylinder (10) of a printing machine at ambient air pressure, comprising the steps of generating an electron beam (12) of sufficient intensity to control the polarization of discrete areas of said ferroelectric material;

controlling said electron beam to thereby control the state of polarization of said printing form (9);

directing said beam onto said ferroelectric material of the printing form, through an imaging space (7, 17) positioned adjacent said printing form (9); and and pneumatically separating the printing cylinder (10) and said ferroelectric layer (9) remote from or outside of said imaging space with respect to said electron beam (12).

12. The method of claim 11, wherein said step of generating the electron beam comprises generating said electron beam in a vacuum; and wherein the step of pneumatically separating the printing cylinder (10) and said ferroelectric layer (9) remote from or outside of said imaging space with respect to said electron beam (12) comprises the step of sealing a portion of said printing form (9) in the vicinity of its exposure to the electron beam against ambient air pressure.

13. The method of claim 12, wherein said sealing step comprises sliding spaced sealing elements (14) over the surface of said printing form; and applying a vacuum between said spaced sealing elements.

14. The method of claim 12, wherein said sealing step comprises introducing a ferro fluid (18) in a gap between a housing (2, 13) having said vacuum for generating the electron beam therein and the surface of said printing form.

15. The method of claim 11, wherein said step of generating said electron beam comprises generating said electron within an evacuated housing (2); and wherein the step of pneumatically separating the printing cylinder (10) and said ferroelectric layer (9) remote from or outside of said imaging space with respect to said electron beam (12) comprises the step of projecting said electron beam through a vacuum-tight electron beam permeable window (25).

16. The method of claim 11, wherein said step of generating said electron beam comprises generating said electron within an evacuated housing (2); and wherein the step of pneumatically separating the printing cylinder (10) and said ferroelectric layer (9) remote from or outside of said imaging space with respect to said electron beam (12) comprises the step of projecting said electron beam through a plate (27) formed with micro channels (26) therein.

17. The method of claim 11, including the step of sensing the presence of secondary electrons generated upon impingement of said electron beam (12) on said printing form (9); and evaluating signals representative of said sensed secondary electrons.

18. The method of claim 17, including the step of controlling at least one of:

focus;

dwell time, of said electron beam (12) upon impingement of said beam at a discrete surface area of said printing form (9) as a function of said signals representative of the secondary electrons.

* * * * *